(12) United States Patent
Wu et al.

(10) Patent No.: US 9,488,894 B2
(45) Date of Patent: Nov. 8, 2016

(54) ELECTRONIC INK DISPLAY DEVICE AND METHOD FOR MANUFACTURING THE SAME

(71) Applicant: E Ink Holdings Inc., Hsinchu (TW)

(72) Inventors: Chi-Ming Wu, Hsinchu (TW); Wen-Chang Lu, Hsinchu (TW); Jen-Yi Juang, Hsinchu (TW); Ming-Sheng Chiang, Hsinchu (TW); Ta-Nien Luan, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 8 days.

(21) Appl. No.: 14/565,407

(22) Filed: Dec. 9, 2014

(65) Prior Publication Data
US 2015/0092263 A1    Apr. 2, 2015

Related U.S. Application Data

(63) Continuation of application No. 13/736,044, filed on Jan. 7, 2013, now Pat. No. 8,937,760.

(30) Foreign Application Priority Data

Mar. 27, 2012    (TW) .............................. 101110611 A

(51) Int. Cl.
*G02B 26/00*    (2006.01)
*G02F 1/167*    (2006.01)
(Continued)

(52) U.S. Cl.
CPC ............... *G02F 1/167* (2013.01); *B32B 38/00* (2013.01); *B32B 38/10* (2013.01); *G02F 1/1339* (2013.01); *G02B 1/105* (2013.01); *G02B 27/0006* (2013.01)

(58) Field of Classification Search
CPC .. G02F 1/167; G02F 2202/28; G02F 1/1339; B32B 38/00; B32B 38/10; G02B 27/0006
USPC .................. 359/296, 900, 507, 513; 345/107
See application file for complete search history.

(56) References Cited

U.S. PATENT DOCUMENTS 7,616,185 B2    11/2009    Yamaguchi et al.
7,692,847 B2 *    4/2010    Kurosawa ............... G02F 1/167
                                                    359/296

(Continued)

FOREIGN PATENT DOCUMENTS

CN    101183201 A    5/2008
CN    101241290 A    8/2008

(Continued)

OTHER PUBLICATIONS

Corresponding Chinese Office Action that these art references were cited on Apr. 14, 2015.

*Primary Examiner* — Tuyen Tra
(74) *Attorney, Agent, or Firm* — CKC & Partners Co., Ltd.

(57) ABSTRACT

A method for manufacturing an electronic ink display device is provided, which includes the steps of: forming an electronic ink layer on an driving substrate; forming a front protective layer and a back protective layer covering outside of the electronic ink layer and outside of the driving substrate separately, in which a dimension of the front protective layer is greater than that of the back protective layer; and filling an sealant covering and surrounding sidewall of the electronic ink layer and sidewall of the driving substrate. An electronic ink display device is also provided.

19 Claims, 9 Drawing Sheets

(51) Int. Cl.
  *B32B 38/00* (2006.01)
  *B32B 38/10* (2006.01)
  *G02F 1/1339* (2006.01)
  *G02B 1/10* (2015.01)
  *G02B 27/00* (2006.01)

(56) References Cited

U.S. PATENT DOCUMENTS 7,729,039 B2   6/2010   LeCain et al.

2002/0050976 A1    5/2002   Yamaguchi et al.
2011/0234950 A1*   9/2011   Yamada .................. G02B 5/201
                                                                    349/109
2011/0273760 A1*  11/2011   Hsieh ...................... G02F 1/167
                                                                    359/296

FOREIGN PATENT DOCUMENTS

CN      101813863 A     8/2010
JP      2009229523 A   10/2009
JP      2010181463 A    8/2010

\* cited by examiner

ELECTRONIC INK DISPLAY DEVICE AND METHOD FOR MANUFACTURING THE SAME

RELATED APPLICATIONS

The present application is a continuation application of U.S. application Ser. No. 13/736,044, filed on Jan. 7, 2013, which was based on, and claims priority from, Taiwan Patent Application Serial Number 101110611, filed on Mar. 27, 2012, the disclosure of which is hereby incorporated by reference herein in its entirely.

BACKGROUND

1. Technical Field

The present disclosure relates to an electronic ink display device and a method for manufacturing the electronic ink display device.

2. Description of Related Art

Generally, an electronic ink display device includes an electronic ink layer and a driving substrate. The electronic ink layer is filled with electronic ink, which is fluid containing charged particles. Under an applied electric field, the charged particles would move in the fluid. Therefore, the charged particles can be controlled by electrodes disposed on the driving substrate, so as to manipulate light reflected from the charged particles to display images.

However, the electronic ink and metal wire extremely vulnerable to the effect of moisture. In this regard, a protective layer can be disposed on respective external surfaces, i.e. outside, of the electronic ink layer and the driving substrate to prevent the moisture or ultraviolet (UV) light from entering internal portion, i.e. inside, of the electronic ink layer and the driving substrate. Also, a sealant can be used to seal up edges of the electronic ink layer and the driving substrate. Nonetheless, while sealing up the edges of the electronic ink layer and the driving substrate by the sealant, some sealant would be remained on edges of the protective layers. The residual sealant is unfavorable for flatness of the protective layers. The residual sealant may cause defects of flatness such as bubbles on any subsequent film-attachment process.

Accordingly, there is still a need for an electronic ink display device and a method for manufacturing the same, in order to solve the problems described above.

SUMMARY

A method for manufacturing an electronic ink display device is provided to maintain flatness of a front protective layer, thus it is useful for employing other processes.

An aspect of the present disclosure is to provide a method for manufacturing an electronic ink display device. According to one embodiment, the method includes steps described below. An electronic ink layer is formed on a driving substrate. An outside of the electronic ink layer has a display surface, and an outside of the driving substrate has a back surface. A front protective layer is then formed covering the display surface. The front protective layer is greater than a dimension of the driving substrate. Subsequently, a sealant is filled covering and surrounding a sidewall of the electronic ink layer between the front protective layer and the back surface of the driving substrate, and a sidewall of the driving substrate.

Another aspect of the present disclosure is to provide an electronic ink display device. In one embodiment, the electronic ink display device includes a driving substrate, an electronic ink layer, a front protective layer and a sealant. The electronic ink layer is disposed on the driving substrate. The front protective layer is disposed on the electronic ink layer. The front protective layer has a dimension greater than a dimension of the driving substrate. The sealant is covering and surrounding a sidewall of the electronic ink layer between the front protective layer and the back surface of the driving substrate, and a sidewall of the driving substrate.

BRIEF DESCRIPTION OF THE DRAWINGS

The disclosure may be more fully understood by reading the following detailed description of the embodiment, with reference made to the accompanying drawings as follows.

DETAILED DESCRIPTION

Figure 1:
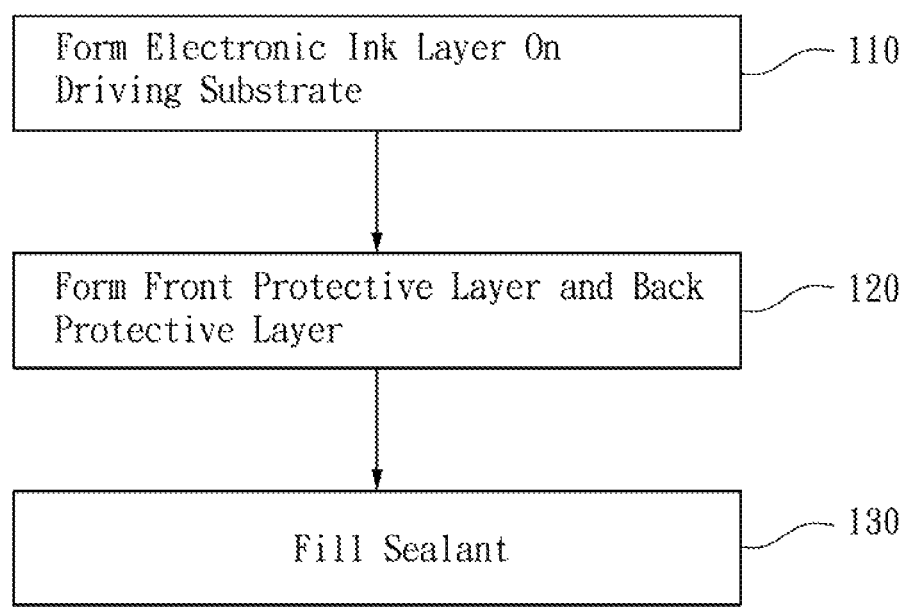
FIG. 1 is a flow chart of a method for manufacturing an electronic ink display device according to one embodiment of the present disclosure.

The present disclosure is described by the following specific embodiments. Those with ordinary skill in the arts can readily understand the other advantages and functions of the present invention after reading the disclosure of this specification. The present disclosure can also be implemented with different embodiments. Various details described in this specification can be modified based on different viewpoints and applications without departing from the scope of the present disclosure.

Reference will now be made in detail to the embodiments of the present disclosure, examples of which are illustrated in the accompanying drawings. Wherever possible, the same reference numbers are used in the drawings and the description to refer to the same or like parts.

Figure 2:
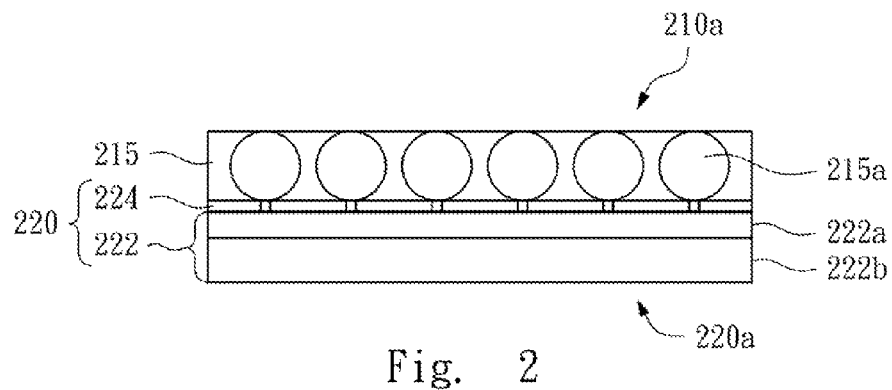
FIGS. 2, 3 and 4 are cross-sectional views schematically illustrating process steps for manufacturing an electronic ink display device according to one embodiment of the present disclosure.
Figure 3:
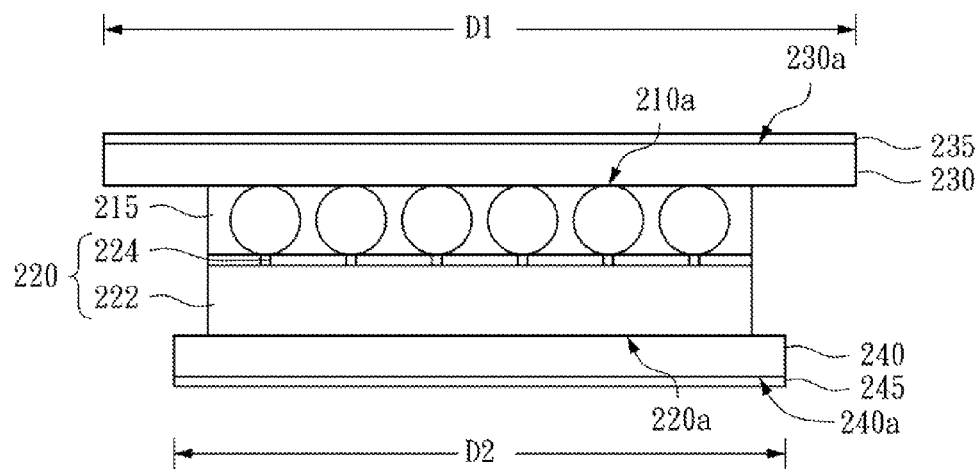
Figure 4:
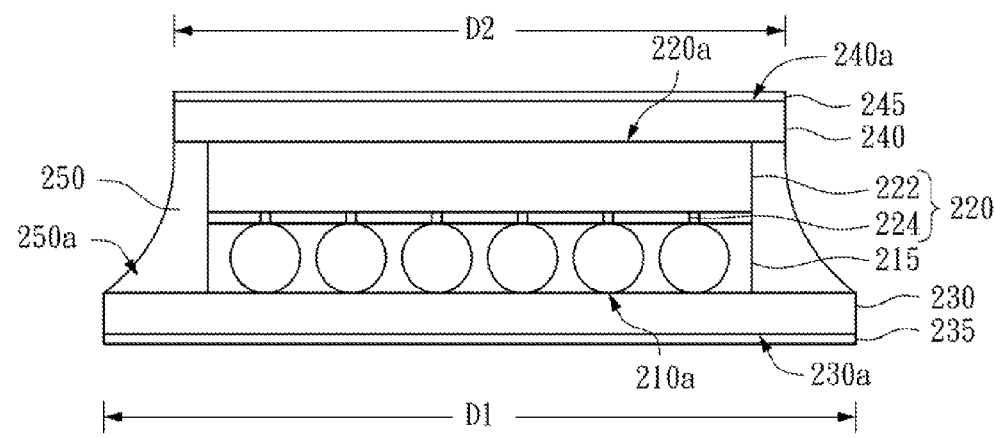

An aspect of the present disclosure is to provide a method for manufacturing an electronic ink display device. FIG. 1 is a flow chart of a method for manufacturing an electronic ink display device according to one embodiment of the present disclosure. FIGS. 2, 3 and 4 are cross-sectional views schematically illustrating process steps for manufacturing an electronic ink display device according to one embodiment of the present disclosure. The electronic ink display device fabricated by the method disclosed herein can be used in electronic paper display devices, but is not limited thereto.

In step 110, an electronic ink layer 215 is formed on a driving substrate 220, as shown in FIG. 2. An outside of the electronic ink layer 215 has a display surface 210a, and an outside of the driving substrate 220 has a back surface 220a. The electronic ink layer 215 contains electronic ink 215a exhibiting a bi-stable characteristic, and thus the written image can be retained continuously.

The driving substrate 220 may include a substrate 222 and active components 224, as shown in FIG. 2. In one embodiment, the substrate 222 is a glass substrate, and the active components are thin film transistors disposed on that substrate. In another embodiment, the driving substrate 220 includes a rigid substrate 222b, a polymer substrate 222a, and active components 224. The polymer substrate 222a disposed on the rigid substrate 222b. The active components 224, covered by the electronic ink layer 215, are formed on the polymer substrate 222a. In the embodiment, after forming the electronic ink layer 215 on the polymer substrate 222a and the active components 224, the rigid substrate 222b is removed from the polymer substrate 222a (the cross-sectional view illustrating the process step is not shown). Subsequently, a flexible laminated structure composed of the polymer substrate 222a, the active components 224 and the electronic ink layer 215 is obtained. The polymer substrate 222a may be formed of polyimide, polyethylene terephthalate, polyethylene naphthalate, or polymethacrylate. The rigid substrate 222b may be made of glass. However, it should be understood that the illustrative structures of the driving substrate 220 above are not limited thereto.

In step 120, a front protective layer 230 and a back protective layer 240 are formed, respectively covering the display surface 210a and the back surface 220a, as illustrated in FIG. 3. Generally, a dimension of a protective layer should be greater than a dimension of a surface that needs to be covered for fully protecting that surface. Thus, a dimension D1 of the front protective layer 230 and a dimension D2 of the back protective layer 240 should be respectively greater than that of the display surface 210a of the electronic ink layer 215 and that of the back surface 220a of the driving substrate 220. In the embodiment, a dimension of the electronic ink layer 215 is substantially identical to that of the driving substrate 220, and thus the dimension D1 of the front protective layer 230 is greater than that of the driving substrate 220. The term "dimension" herein refers to a two-dimensional area constructed by a length of a surface and a width thereof. In other words, the length and the width of the front protective layer 230 are separately larger than those of the display surface 210a. The length and the width of the back protective layer 240 are individually greater than those of the back surface 220a. Therefore, the front protective layer 230 and the back protective layer 240 can fully cover the display surface 210a and the back surface 220a respectively. Also, the front protective layer 230 and the back protective layer 240 can be employed to prevent moisture and ultraviolet light from entering the electronic ink layer 215 and the active components 224. The front protective layer 230 and the back protective layer 240 may be made of polyethylene terephthalate or polyethylene naphthalate. In addition, the front protective layer 230 should be a transparent material because it needs to cover the display surface 210a.

It is important to note that the dimension D1 of the front protective layer 230 should be greater than the dimension D2 of the back protective layer 240; that is to say, the length and the width of the front protective layer 230 should be individually larger than those of the back protective layer 240. It is used to avoid the phenomenon that residual sealant is formed on sides of the front protective layer 230 during the process of filling a sealant (i.e. step 130). The phenomenon would be described in detail in step 130.

In one embodiment, the front protective layer 230 further includes a front release film 235 covering an outside surface 230a. In one embodiment, the back protective layer 240 further includes a back release film 245 covering an outside surface 240a. The front release film 235 and back release film 245 are respectively utilized to avoid scraping the outside surfaces 230a, 240a during manufacturing or transporting processes. The materials of the front release film 235 and the back release film 245 may be the same as or different from those of the front protective layer 230 and the back protective layer 240.

Subsequently, the structure shown in FIG. 3 is inverted for filling a sealant. In step 130, as shown in FIG. 4, the sealant 250 is filled covering and surrounding a sidewall of the electronic ink layer 215 between the front protective layer 230 and the back protective layer 240, and a sidewall of the driving substrate 220. For instance, a syringe can be used to inject the sealant 250 into a space 250a. The space 250a is then filled with the sealant 250 by capillary action for sealing up edges of both the electronic ink layer 215 and the driving substrate 220. The sealant 250 may be made of acrylic-based, epoxy-based or silicon-based resin. The dimension D1 of the front protective layer 230 is greater, such that the sealant 250 would not contact with periphery of the front protective layer 230 during flowing and filling up the space 250a. Accordingly, the front protective layer 230 exhibiting high flatness is beneficial for accomplishing some processes such as a film attachment process. Although the sealant 250 may touch sides of the back protective layer 240, it would not affect the display surface 210a of the electronic ink display device.

In one embodiment, a step of curing the sealant 250 is employed after filling the sealant 250. For instance, heat or ultraviolet light can be provided to cure the sealant 250.

In one embodiment, a step of cutting the front protective layer 230, the sealant 250 and the back protective layer 240 in alignment is carried out after curing the sealant 250. The dimension of the front protective layer 230 is substantially identical to that of the back protective layer 240. For instance, laser can be utilized to cut the front protective layer 230, the sealant 250 and the back protective layer 240.

In another embodiment, a step of removing the back release film 245 is accomplished before filling the sealant 250. It is because the back release film 245 does not affect the front protective layer 230 for employing other processes. In another embodiment, a step of removing the back release film 245 is carried out after curing the sealant 250. In another embodiment, the back release film 245 is not removed.

Figure 5:
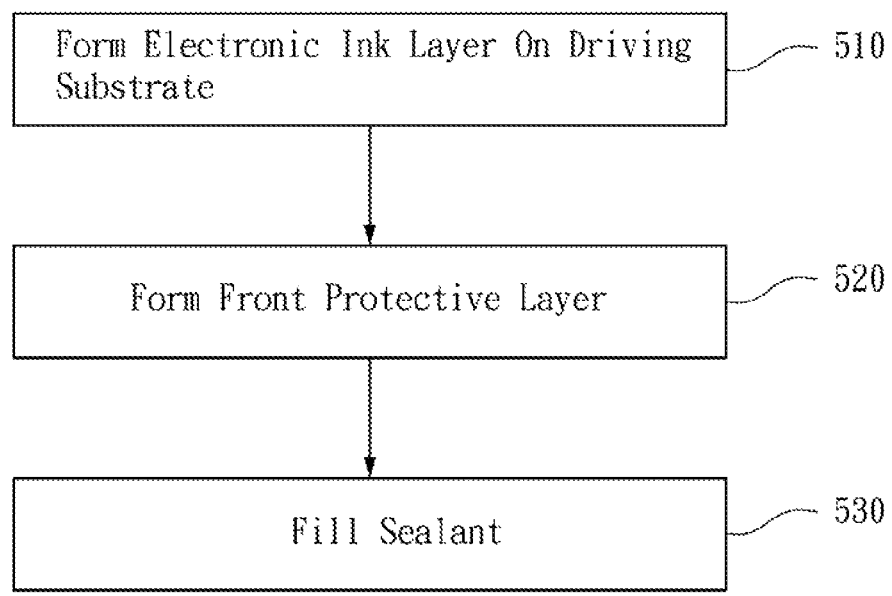
FIG. 5 is a flow chart of a method for manufacturing an electronic ink display device according to another embodiment of the present disclosure.

In one embodiment, before attaching other materials on the outside surface 230a, the front release film 235 is not removed to avoid scraping the outside surface 230a. When preparing to attach other materials on the outside surface 230a, the front release film 235 is removed. FIG. 5 is a flow chart of a method for manufacturing an electronic ink display device according to another embodiment of the present disclosure.

Figure 6:
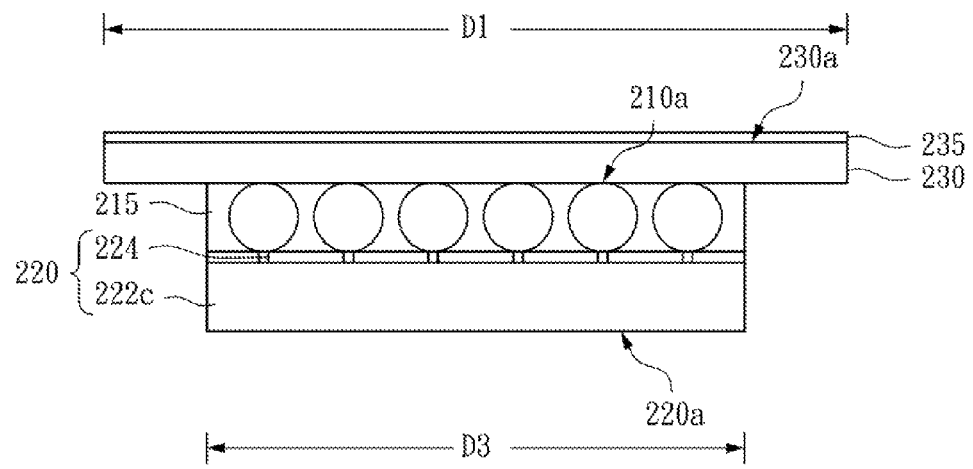
FIGS. 6 and 7 are cross-sectional views schematically illustrating process steps for manufacturing an electronic ink display device according to another embodiment of the present disclosure.

In step 510, an electronic ink layer 215 is formed on a driving substrate 220, as shown in FIG. 6. An outside of the electronic ink layer 215 has a display surface 210a, and an outside of the driving substrate 220 has a back surface 220a.

In one embodiment, the driving substrate 220 includes a rigid substrate 222c and active components 224, as illustrated in FIG. 6. The active components 224, covered by the electronic ink layer 215, are disposed on the rigid substrate 222c. The rigid substrate 222c may be made of glass.

In step 520, a front protective layer 230 is formed covering the display surface 210a, as shown in FIG. 6. The dimension of the front protective layer 230 should be greater than that of the display surface 210a. It is important to note that the dimension D1 of the front protective layer 230 should be greater than the dimension D3 of the driving substrate 220; that is to say, the length and the width of the front protective layer 230 should be individually larger than those of the driving substrate 220. It is used to avoid the phenomenon that residual sealant is formed on sides of the front protective layer 230 during a step of filling a sealant (i.e. step 530). The phenomenon would be described in detail in step 530. In addition, the rigid substrate 222c such as glass can resist moisture from entering the active components 224, such that there is no need to dispose a back protective layer on the back surface 220a.

In one embodiment, the front protective layer 230 further includes a front release film 235 covering an outside surface 230a to avoid scraping the outside surface 230a during manufacturing or transporting processes.

Figure 7:
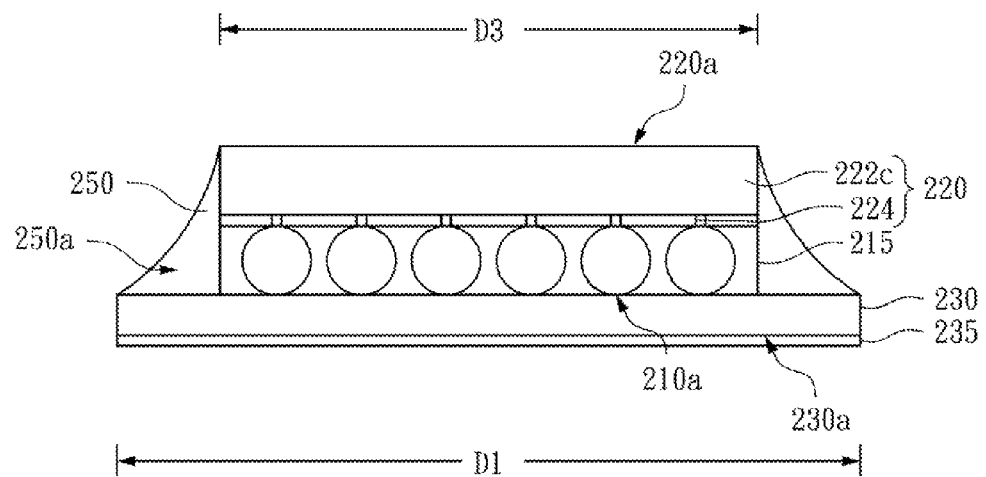

Subsequently, the structure shown in FIG. 6 is inverted for filling a sealant. In step 530, as shown in FIG. 7, the sealant 250 is filled covering and surrounding a sidewall of the electronic ink layer 215 between the front protective layer 230 and the back surface 220a of the driving substrate 220, and a sidewall of the driving substrate 220. The dimension D1 of the front protective layer 230 is greater than the dimension D3 of the driving substrate 220, such that the sealant 250 would not touch periphery of the front protective layer 230 during flowing and filling up the space 250a. Accordingly, the front protective layer 230 exhibiting high flatness is beneficial for performing a film attachment process.

Figure 8:
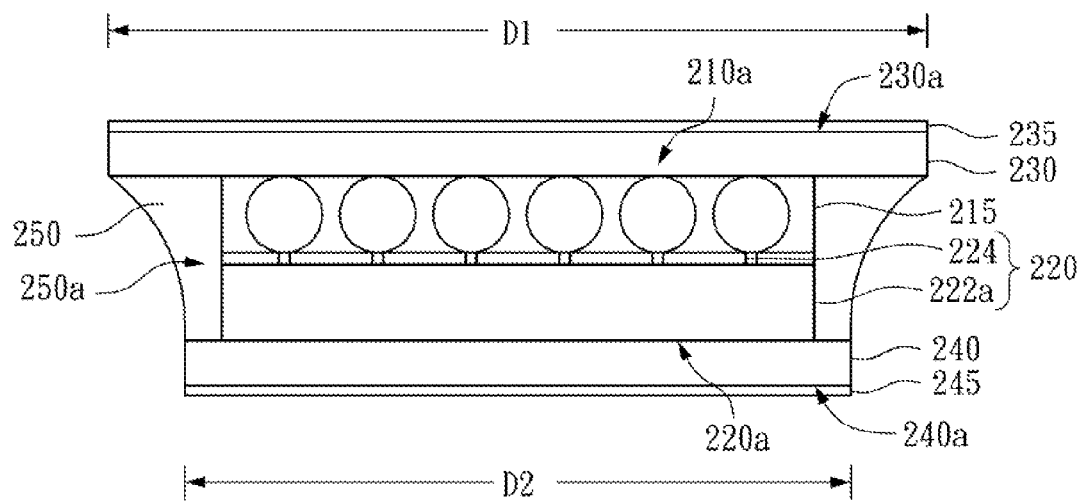
FIG. 8 is a schematic diagram of an electronic ink display device according to one embodiment of the present disclosure.

Another aspect of the present disclosure is to provide an electronic ink display device. In one embodiment, as shown in FIG. 8, the electronic ink display device 800 includes a back protective layer 240, a driving substrate 220, an electronic ink layer 215, a front protective layer 230 and a sealant 250.

The driving substrate 220 is disposed on the back protective layer 240. The electronic ink layer 215 is disposed on the driving substrate 220. The front protective layer 230 is disposed on the electronic ink layer 215. The sealant 250 is covering and surrounding a sidewall of the electronic ink layer 215 between the front protective layer 230 and the back protective layer 240, and a sidewall of the driving substrate 220. The front protective layer 230 and the back protective layer 240 can be employed to prevent moisture from entering the electronic ink layer 215 and the active components 224. The sealant 250 can be used to resist moisture from going in the electronic ink display device 800 through peripheral portion thereof. It is significant to note that the dimension D1 of the front protective layer 230 is larger than the dimension D2 of the back protective layer 240; that is, the length and the width of the front protective layer 230 are individually greater than those of the back protective layer 240.

In one embodiment, the driving substrate 220 includes a polymer substrate 222a and active components 224. The active components 224, covered by the electronic ink layer 215, are formed on the polymer substrate 222a.

In one embodiment, a back release film 245 and a front release film 235 can be unnecessarily disposed on the outside surfaces of the back protective layer 240 and the front protective layer 230 respectively. The back release film 245 and the front release film 235 are respectively utilized to avoid scraping the outside surfaces of the back protective layer 240 and the front protective layer 230.

Figure 9A:
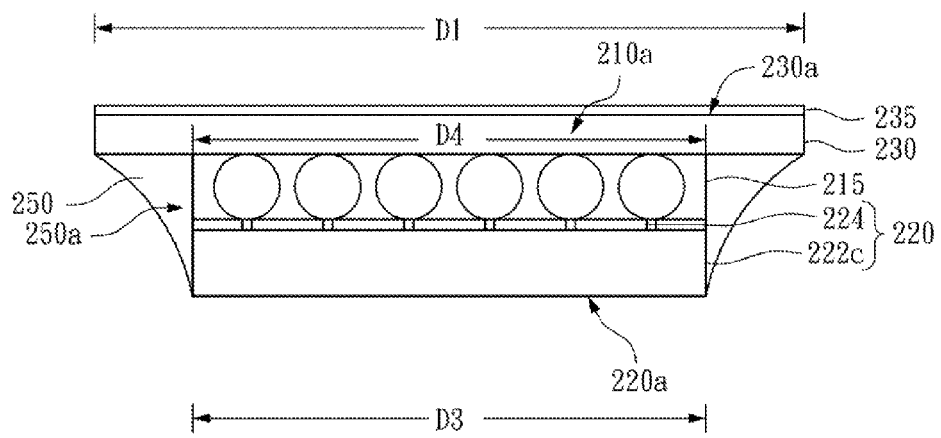
FIGS. 9A-9B are schematic diagrams of electronic ink display devices according to another embodiments of the present disclosure.
Figure 9B:
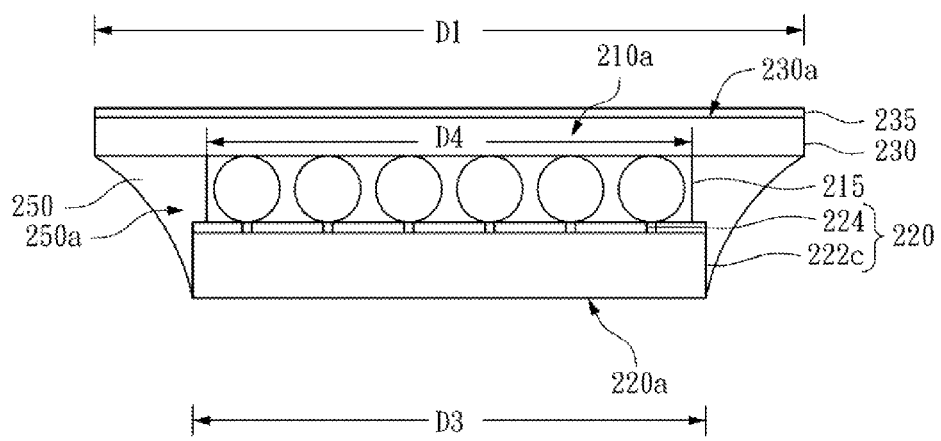

In another embodiments, as shown in FIGS. 9A-9B, the electronic ink display devices 900A, 900B all include a driving substrate 220, an electronic ink layer 215, a front protective layer 230 and a sealant 250, free of any back protective layer.

The electronic ink layer 215 is disposed on the driving substrate 220. The front protective layer 230 is disposed on the electronic ink layer 215. The sealant 250 is covering and surrounding a sidewall of the electronic ink layer 215 between the front protective layer 230 and the back surface 220a, and a sidewall of the driving substrate 220. It is important to notice that the dimension D1 of the front protective layer 230 is larger than the dimension D3 of the driving substrate 220; that is, the length and the width of the front protective layer 230 are individually larger than those of the driving substrate 220.

In one embodiment, the driving substrate 220 includes a rigid substrate 222c and active components 224. The active components 224, covered by the electronic ink layer 215, are disposed on the rigid substrate 222c. In addition, the rigid substrate 222c such as glass can resist moisture from going in the active components 224, such that there is no need to dispose a back protective layer on the back surface 220a. In one embodiment, the dimension D4 of the electronic ink layer 215 is substantially the same as the dimension D3 of the driving substrate 220, as shown in FIG. 9A. In another embodiment, the dimension D4 of the electronic ink layer 215 is less than the dimension D3 of the driving substrate 220, as shown in FIG. 9B.

In one embodiment, a front release film 235 can be unnecessarily disposed on the outside surface of the front protective layer 230 to prevent scraping that surface.

As shown in FIGS. 10A to 10G, a driving substrate 220 having a substrate (not shown) is applied in the manufacturing process according to another embodiment of the present disclosure. As an example, the substrate is a thin glass, which has a thickness ranging from 0.05 to 0.3 mm.

Figure 10A:
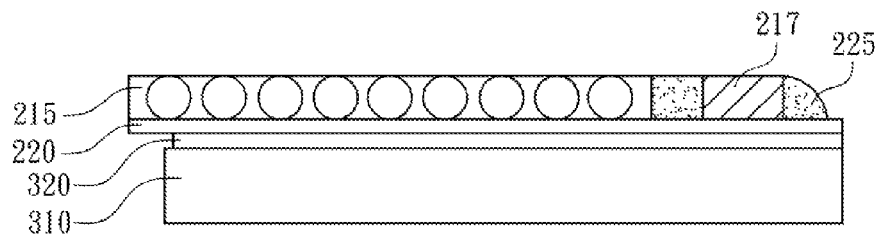
FIGS. 10A to 10G are cross-sectional views schematically illustrating process steps for manufacturing an electronic ink display device according to another embodiment of the present disclosure.

Since the thin glass is not rigid enough to support thin film transistors (not shown) and other elements, a carrier substrate 310 having glue 320 is disposed beneath. Next, the thin film transistors, the electronic ink layer 215 and an integrated circuit (IC) 217 are formed on the thin glass, and an edge reinforcement glue 225 is then filled in to protect the edges of both the electronic ink layer 215 and the IC 217, as shown in FIG. 10A.

Figure 10B:
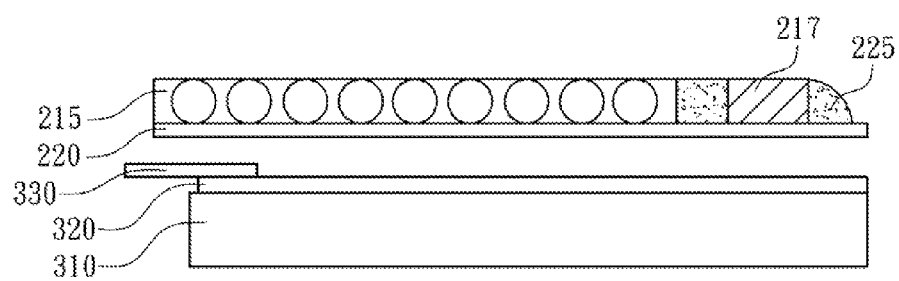

Next, the carrier substrate 310 having the glue 320 is removed by a heated steel sheet 330 or a heated steel wire 330, as shown in FIG. 10B.

Figure 10C:
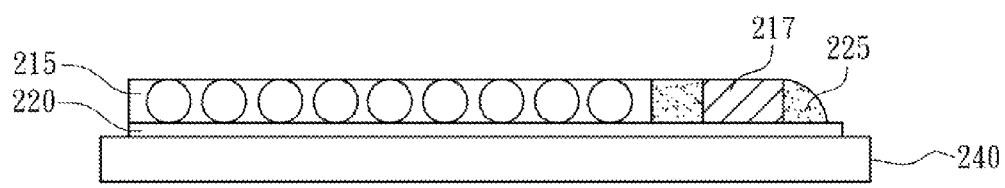
Figure 10D:
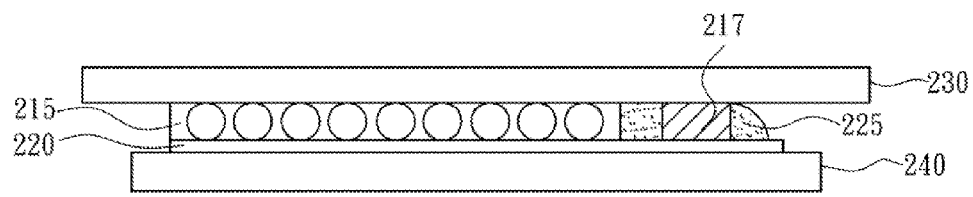
Figure 10E:
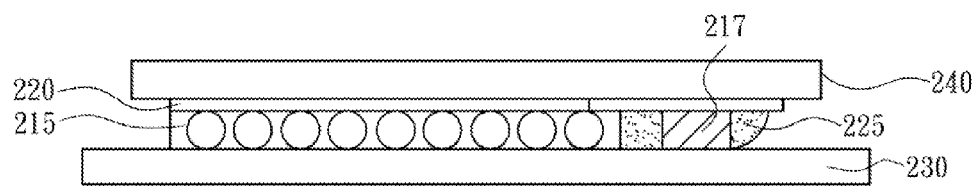

A back protective layer 240 and a front protective layer 230 are sequentially formed on the driving substrate 220 and the electronic ink layer 215 respectively, and the structure is then inverted, as shown in FIGS. 10C to 10E. In one example, the front protective layer 230 is a cover lens.

Figure 10F:
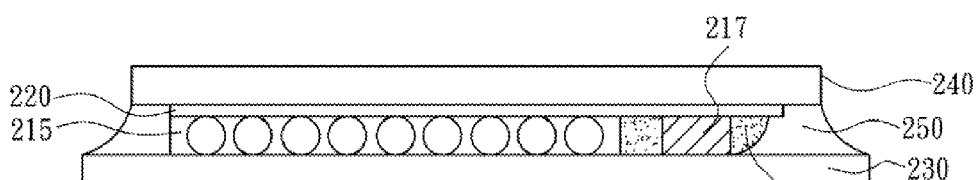
Figure 10G:
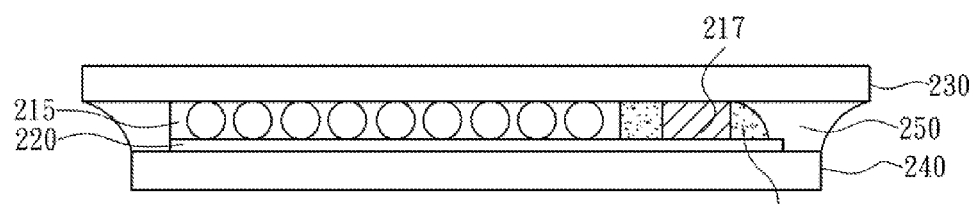

A sealant 250 is filled surrounding sidewalls of the electronic ink layer 215 and the driving substrate 220 to form the electronic ink display device 1000, as shown in FIG. 10F. The electronic ink display device 1000 is then inverted to employ further processing, as the shown as in FIG. 10G.

Figure 11:
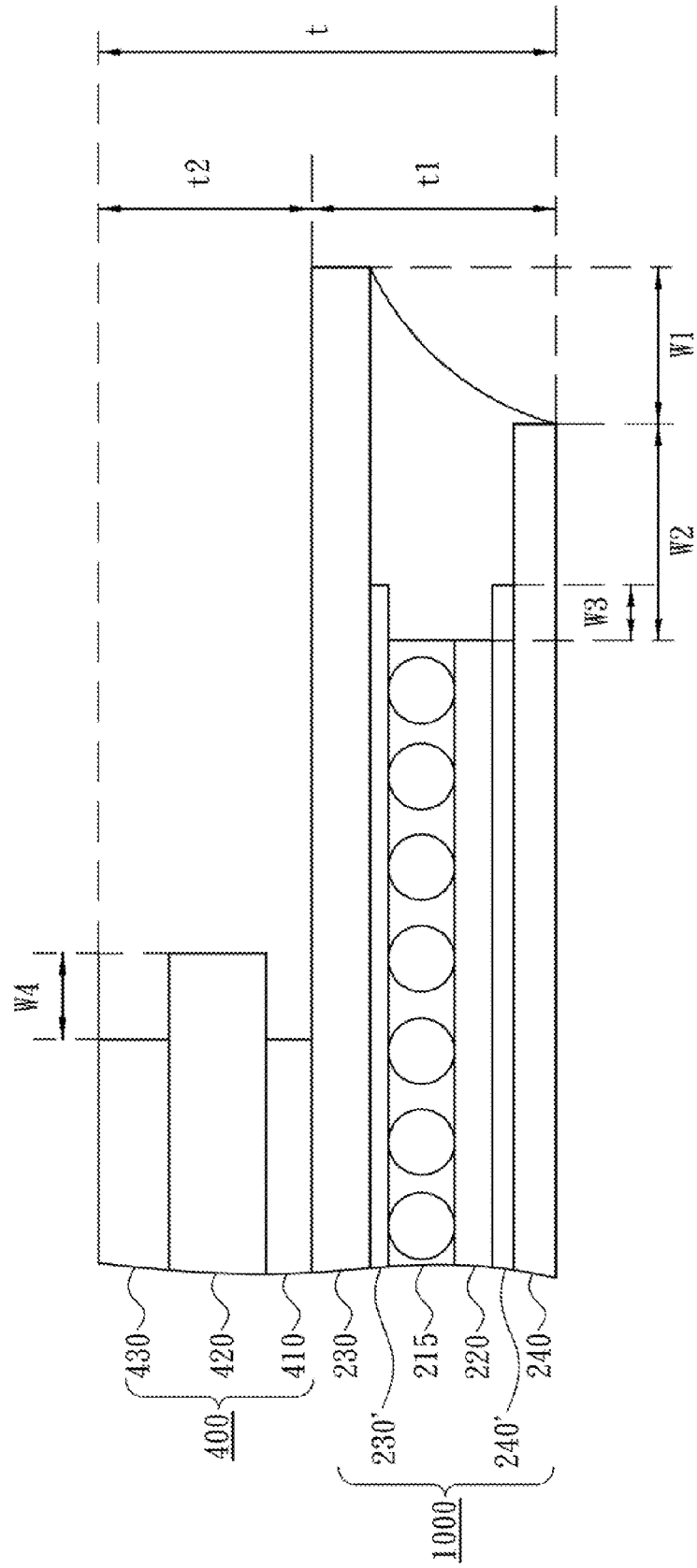
FIG. 11 is a schematic diagram of an electronic ink display device with a front light plate according to another embodiment of the present disclosure.

In one embodiment, a front light plate 400 including a light guide plate optical clear adhesive (LGP-OCA) glue 410, a LGP 420 and an anti-glare film with OCA glue 430 is disposed on the front protective layer 230, as shown in FIG. 11. Further, the electronic ink display device 1000 can include a front OCA glue 230' and a back OCA glue 240'.

In one embodiment, the electronic ink display device 1000 has a thickness t1 ranging from 0.3 to 2 mm. The front light plate 400 has a thickness t2 ranging from 0.3 to 1.5 mm. Therefore, the total thickness t of the electronic ink display device 1000 and the front light plate 400 is only in a range of 0.6 to 3.5 mm.

In one embodiment, the width W1 between the front protective layer 230 and the back protective layer 240 is in a range of 0.2 to 2 mm. As such, during the step of filling the sealant 250, there is no residual sealant formed on edge of the front protective layer 230. The width W2 between the back protective layer 240 and the edge of the electronic ink layer 215 (or the driving substrate 220) is in a range of 0.6 to 2.5 mm.

In one embodiment, the width W3 between the back OCA 240' (or the front OCA 230') and the edge of the electronic ink layer 215 is in a range of −0 to 2 mm, as shown in FIG. 11. In another embodiment, the edge of the electronic ink layer 215 is more prominent than the edge of the back OCA 240' (or the front OCA 230'), and the width therebetween is less than or equal to 1 mm.

In one embodiment, the width W4 between the LGP 420 and the anti-glare film with the OCA glue 430 (or the LGP-OCA glue 410) is in a range of 0 to 2 mm, as shown in FIG. 11. In another embodiment, the edge of the anti-glare film with the OCA glue 430 (or the LGP-OCA glue 410) is more prominent than the edge of the LGP 420, and the width therebetween is less than or equal to 1 mm.

The embodiments disclosed herein are utilized to prevent sealant touching the sides of the front protective layer during the step of filling sealant by designing the dimension of the front protective layer greater than that of either the back protective layer or the driving substrate. Therefore, the front protective layer 230 of the electronic ink display device 40 exhibiting high flatness is beneficial for carrying out some packaging processes. In other words, the manufacturing methods can be employed to avoid generating defects during packaging processes.

Although the present disclosure has been described in considerable detail with reference to certain embodiments thereof, other embodiments are possible. Therefore, the spirit and scope of the appended claims should not be limited to the description of the embodiments contained herein.

It will be apparent to those ordinarily skilled in the art that various modifications and variations may be made to the structure of the present disclosure without departing from the scope or spirit of the disclosure. In view of the foregoing, it is intended that the present disclosure cover modifications and variations thereof provided they fall within the scope of the following claims.

What is claimed is:

1. A display device, comprising:
a display medium layer on a driving substrate, wherein an outside of the display medium layer has a display surface, and an outside of the driving substrate has a back surface;
a front protective layer covering the display surface, wherein the front protective layer is in contact with the display medium layer and has a dimension greater than a dimension of the driving substrate;
an integrated circuit disposed on the driving substrate and spaced apart from the display medium layer;
an edge reinforcement glue disposed on the driving substrate, wherein the edge reinforcement glue is positioned on both sides of the integrated circuit to be interposed between and contacting one of the sides of the integrated circuit and the display medium layer, and contacting the other side of the integrated circuit; and
a sealant wherein:
on one side of the display device, the sealant covers and surrounds a sidewall of the display medium layer between the front protective layer and the back surface of the driving substrate, and a sidewall of the driving substrate; and
on an opposite side of the display device, the sealant covers and surrounds the sidewall of the driving substrate, and a part of the edge reinforcement glue which contacts said other side of the integrated circuit.

2. The display device of claim 1, wherein the display medium layer is a bi-stable display layer.

3. The display device of claim 2, wherein the bi-stable display layer comprises an electronic ink layer.

4. The display device of claim 1, further comprising a back protective layer beneath the driving substrate and covering the back surface of the driving substrate, and the sealant covers and surrounds the sidewall of the display medium layer between the front protective layer and the back protective layer, and the sidewall of the driving substrate.

5. A display device, comprising:
a display medium layer, wherein an outside of the display medium layer has a display surface;
a front protective layer disposed on the display medium layer;
an integrated circuit laterally adjacent to and spaced apart from the display medium layer;
an edge reinforcement glue positioned on both sides of the integrated circuit to be interposed between and contacting one of the sides of the integrated circuit and the display medium layer, and contacting the other side of the integrated circuit;
a sealant wherein:
on one side of the display device, the sealant covers and surrounds a sidewall of the display medium layer; and
on an opposite side of the display device, the sealant covers a part of the edge reinforcement glue which contacts said other side of the integrated circuit; and
a back protective layer disposed beneath the display medium layer having a dimension smaller than the dimension of the front protective layer.

6. The display device of claim 5, wherein the front protective layer is in contact with the display medium layer.

7. The display device of claim 5, wherein the display medium layer is disposed on a driving substrate and the back protective layer is beneath the driving substrate and covering a back surface of the driving substrate.

8. The display device of claim 7, wherein the front protective layer has a dimension greater than a dimension of the driving substrate.

9. The display device of claim 7, wherein the display medium layer is disposed between the front protective layer and a back surface of the driving substrate.

10. The display device of claim 7, wherein the sealant covers and surrounds a sidewall of the driving substrate.

11. The display device of claim 7, wherein the driving substrate has a dimension smaller than the dimension of the back protective layer.

12. A display device, comprising:
- a driving substrate including a plurality of active components disposed on a rigid substrate or a polymer substrate;
- a display medium layer disposed on the driving substrate, wherein the display medium layer covers the active components, and an outside of the display medium layer has a display surface;
- a front protective layer covering the display surface, wherein the front protective layer is in contact with the display medium layer;
- an integrated circuit disposed on the driving substrate and spaced apart from the display medium layer;
- an edge reinforcement glue disposed on the driving substrate, wherein the edge reinforcement glue is positioned on both sides of the integrated circuit to be interposed between and contacting one of the sides of the integrated circuit and the display medium layer, and contacting the other side of the integrated circuit; and
- a sealant wherein:
  - on one side of the display device, the sealant covers and surrounds a sidewall of the display medium layer between the front protective layer and the back surface of the driving substrate, and a sidewall of the driving substrate; and
  - on an opposite side of the display device the sealant covers and surrounds the sidewall of the driving substrate, and a part of the edge reinforcement glue which contacts said other side of the integrated circuit.

13. The display device of claim 12, wherein the rigid substrate has a thickness in a range of 0.05 to 0.3 mm.

14. The display device of claim 12, wherein a dimension of the display medium layer is less than a dimension of the driving substrate.

15. The display device of claim 12, wherein a material of the polymer substrate comprises polyimide, polyethylene terephthalate, polyethylene naphthalate, or polymethacrylate.

16. The display device of claim 12, wherein a material of the rigid substrate comprises glass.

17. The display device of claim 12, wherein the front protective layer is made of a transparent material.

18. The display device of claim 17, wherein the transparent material comprises polyethylene terephthalate or polyethylene naphthalate.

19. The display device of claim 12, wherein a material of the sealant comprises acrylic-based, epoxy-based or silicon-based resin.

* * * * *